Patented May 8, 1951

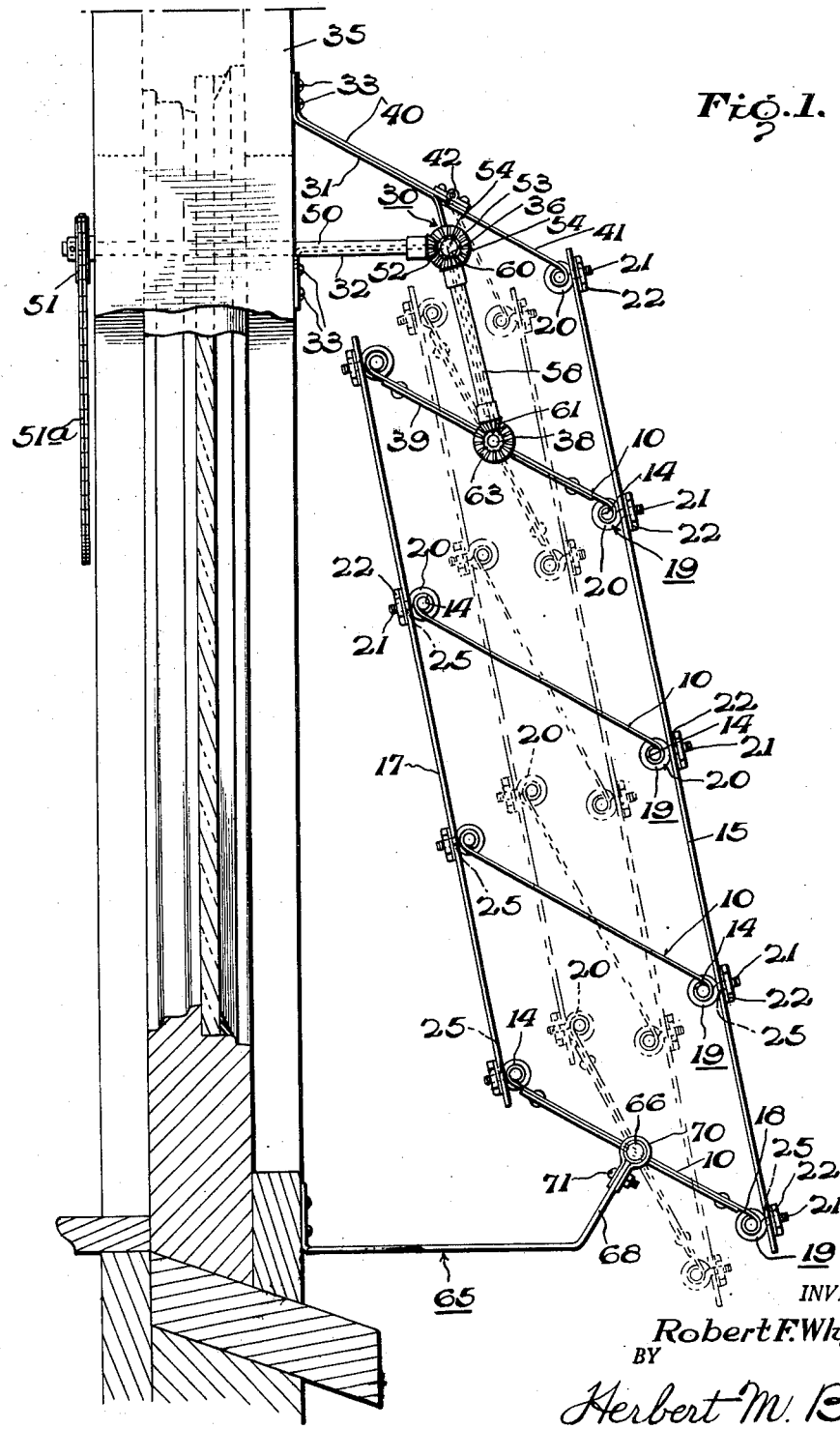

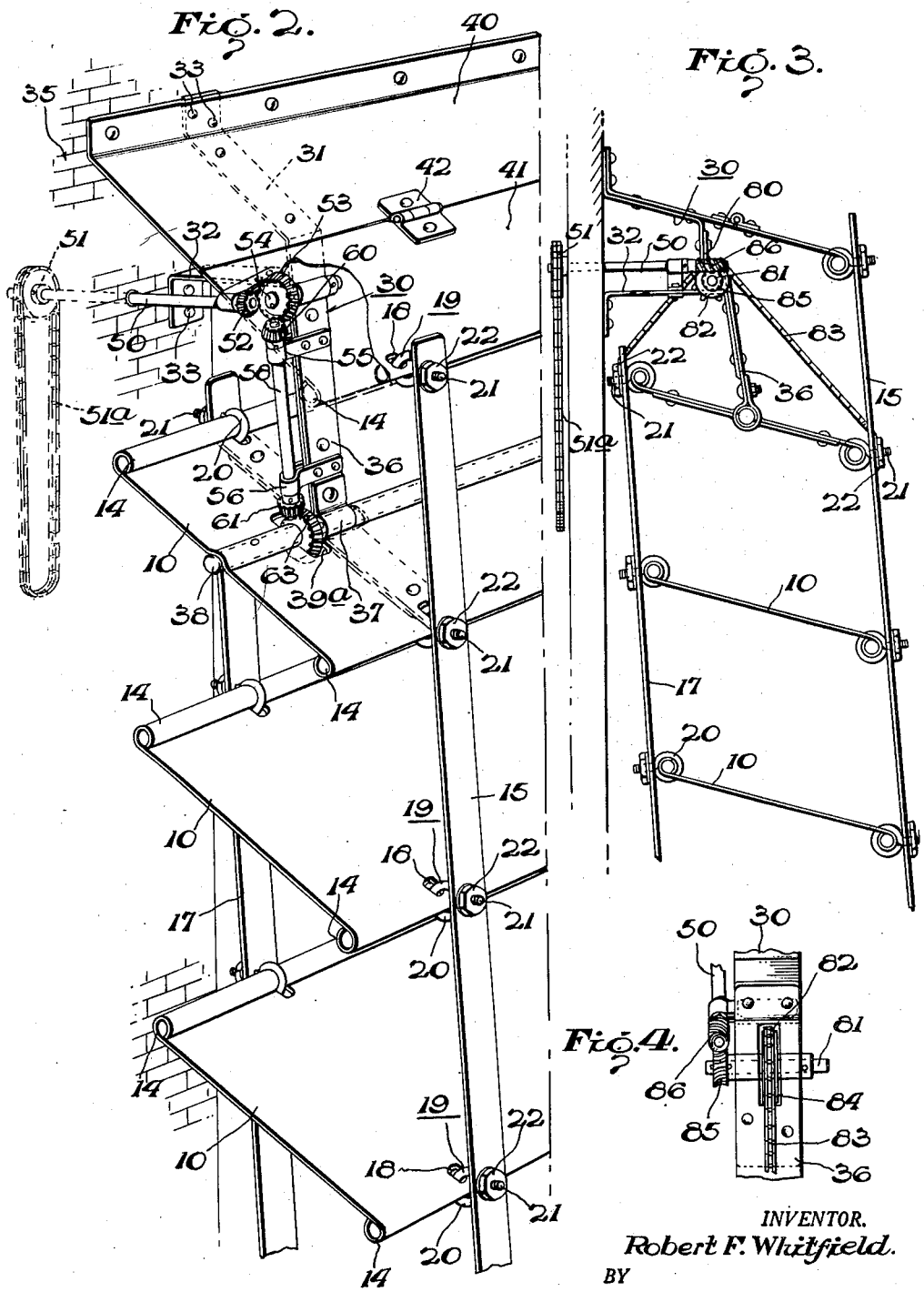

2,551,917

UNITED STATES PATENT OFFICE 2,551,917

AWNING

Robert F. Whitfield, Jackson, Miss.

Application October 17, 1947, Serial No. 780,462

2 Claims. (Cl. 20—57.5)

The present invention relates to awnings and more particularly to awnings formed of adjustable slats adapted to provide protection from the weather while simultaneously providing ample ventilation.

It is an object of the invention to provide novel means for mounting slat type awnings, whereby simple and rapid adjustment of the slats is accomplished with one operating member.

Another object is to develop a special mounting arrangement for the awning slats, which is very economical to manufacture, durable and highly efficient in operation.

A further object is to provide a novel supporting bracket for a slat type awning adapted to cooperatively co-act with a special slat mounting arrangement.

Broadly the present invention comprises an awning sloped downwardly from a novel support means mounted over an opening to be sheltered thereby, said awning being composed of a plurality of tiltable slats formed from metal, glass, Masonite, wood or any other desirable material, and means operable from the interior side of a framework or wall around the opening to regulate the positions of the awning slats.

The above and other objects and advantages of the invention will appear more fully hereinafter from a consideration of the detailed description which follows, taken together with the accompanying drawings wherein two embodiments are illustrated.

In the drawings wherein like reference characters refer to like parts throughout the several views, Figure 1 is a side elevation view of the invention installed over a window.

Figure 2 is a front elevation view of the awning and the single operator system therefor.

Figure 3 is a side elevation of another embodiment of my invention.

Figure 4 is a fragmentary front view of the bracket to show the mounting of the slat operating means for Figure 3.

Referring more specifically to the drawings and first with particular reference to Figure 2, there is shown one embodiment of the awning applied over a window opening. The awning comprises a structure formed of a plurality of slats 10 pivotally connected in spaced apart relation to one or more front straps 15 and relatively shorter rear straps 17. Each slat has a longitudinal rolled marginal edge 14. This edge provides a hollow elongated tube along the length of each slat which serves as a fulcrum or pivot point. Opposite the flat surface of each of the straps 15 and 17, the tubular edges are formed with slots 18 to receive eye bolts 19, see Fig. 1.

The eye bolts 19 include a parted eyelet head portion 20 and a thread shank 21 on which is mounted a washer and nut 22. The bolts 19 are connected to the straps 15 and 17 by securing the parted eyelet 20 around the rolled edge 14 through each slot 18. The shank 21 of each eye bolt 19 projects through one of a plurality of openings or slots 25 formed in the straps at equidistantly spaced intervals and the washer and nut 22 are then applied on the shank.

The front and rear straps 15 and 17 are preferably arranged in aligned pairs on each side and near each end of the slats 10, and are arranged to be moved longitudinally in opposite directions to each other to pivot the slats to open and closed positions, as shown in Figure 1 by the solid and dotted line positions. To provide for the actuation of the slats to their respective positions, I have developed a novel top bracket, preferably one for each side of the awning, comprised of a pair of supporting legs 31 and 32 adapted to be secured by suitable means, such as bolts or screws 33 to a vertical wall or body 35.

The legs 31 and 32 of each bracket 30 converge from the attaching surface 35, and are secured together to form a single oblique or angular arm 36 from wall 35. This arm 36 may, as shown, be a continuation of the leg members and at its lower end is formed into a loop 37 to encircle a shaft 38. This shaft 38 is mounted on the flat surface of the top slat 10 by straps 39 which loop around the shaft and are riveted to slat 10 transversely. The arm 36 extends downwardly in an angular plane substantially parallel to that of the straps 15 and 17 and thus extends through a T-shaped opening 39a in the slat 10 and pivots on shaft 38. It is primarily the angle of the arm 36 which determines the angular position of the entire awning from the side of the building, porch or other structure to which it is fastened.

The leg of each bracket 30 is formed of flat strap material and serves to support the top portion of the awning, which makes a finish against the head casing or wall 35. This finish keeps rain and snow from seeping inside the awning at the top. This top portion of the awning comprises a double slat, one part being a flat bar or slat 40, and the other part a slat 41 pivoted to the front marginal edge of the slat 40 by hinges 42. The slat 41 is formed along its front marginal edge with a tubular portion identical with the tubular edge 14 of the full-width slats 10, so as to pivotally connect with the top end of the longer front straps 15 by means of the eyelet bolts 19, while the shorter rear strap 17 is pivoted to the topmost full-width slat 10 below the lower leg 32 of the bracket 30.

Thus there is provided by the bracket 30 a two-point suspension at each bracket around shaft 38 and hinge 42 with floating pivot points at the top ends of the front and rear straps 15 and 17, respectively, to thereby permit adjustment of the slats as shown in Figure 1.

Special means for adjusting the awning slats is provided and comprises a shaft 50 extending from inside a building wall window casing, porch railing or other barrier around an opening to and beyond the exterior side thereof, see Figures 1 and 2. On the inner end of the shaft 50 is a sprocket 51 and operating chain 51a, while on the outer end of the shaft is a bevel gear 52, which meshes with a larger bevel gear 53 journalled on a stub shaft 54 carried by the bracket 30 at its outer edge. Fastened to the longitudinal edge of the arm 36 of the bracket by looped straps 55 and 56 is a second shaft 58.

Keyed to each end of shaft 58 are upper and lower bevel gears 60 and 61, respectively. The upper bevel gear 60 meshes with gear 53, while bevel gear 61 meshes with a bevel gear 63 keyed to the shaft 38 mounted on the top slat 10 as previously described by rivets and straps 39. This gear 63 projects through the T-opening 39a in the slat 10.

The lower end of the awning is secured to the wall 35 or the like at each side of the opening to be protected by brackets 65, see Fig. 1. These brackets in turn secure to each end edge of the bottom slat 10 by means of a split pin 66. This pin is turnably mounted on the upturned end 68 of the brackets 65 by means of a looped strap 70 fastened thereon by bolt or rivet 71. For example, the split part of the pin 66 slides over the end of the slat 10 and is retained in the loop of strap 70 by a set screw not shown. However, to allow for turning of the pin 66 in the loop the strap is formed with an elongated slot, not shown, so that the set screw can oscillate therein when the slat and pin 66 are turned during slat adjustment.

Thus the lower portion of the awning is well supported and made sufficiently stable to resist the strain and stress imposed thereon by the sprocket and gear actuating mechanism.

*Operation*

Assuming that the awning has its slats in their open position for maximum air and light reception and it is desired to adjust the slats to provide protection from a rain and wind storm, which has suddenly developed. All that is necessary is to pull the chain 51a and impart rotation to sprocket 51 and shaft 50, which in turn through bevel gears 52 and 53 will turn bevel gears 60 and 61 and the shaft 58. This turning of the shaft 58 operates gear 63 keyed to shaft 38 and secured to the top slat 10, thereby imparting a tilting motion to it and to all the remaining slats as well as the top half-slat 41.

Because of the shorter length of the rear strap 17, its top end moves as indicated by the arrow freely under the lower leg of the bracket 30.

In the embodiment shown in Figures 3 and 4 the operating mechanism is different, but the slats 10 and straps 15 and 17 are identical. For example, the bracket 30 is formed with an angle brace 80 with a plane surface above the leg 32 of the bracket. Mounted on this brace is a stub shaft 81 on which is journalled a sprocket wheel 82. This wheel rotates in slots 84 formed through the leg 32 and the plane surface of brace 80. Looped over the sprocket wheel 82 is chain 83. One end of the chain connects to the shank 21 of a front fastener for front strap 15 and the other to the shank 21 of a rear fastener for rear strap 17.

At one end of the shaft 81 is a worm drive comprising a gear 85, which is driven by a worm gear 86 on the end of actuator shaft 50.

To operate the slats 10 with this form of the invention, rotation is imparted to shaft 50 from inside the building by pulling on chain 51a. This imparts rotation to the sprocket wheel 82, which in turn actuates the sprocket chain 83 to cause movement of the slats 10.

Thus I have provided a novel awning which is durable, economical to manufacture and so assembled and mounted as to provide a highly efficient control of the same by the simple manipulation of one control lever.

While only two embodiments of the present invention have been illustrated and described, other changes and modifications which will now appear to those skilled in the art may be made without departing from the scope of the present invention. To determine the scope of the invention reference should be had to the appended claims.

What is claimed is:

1. The combination of a slat-type awning and means for operating said awning from within a building wall, said awning including a plurality of pivoted slats supported by brackets at top and bottom pivoted to the respective upper and lower awning slats, a top pivoted slat above the upper awning slat, a chain and sprocket shaft extending from inside the wall along a leg of one of said brackets, a gear on an end of said shaft, a second shaft carried by a second leg of said bracket having lower and upper ends, gears on each end of said second shaft, an idler gear rotatably supported by the top end of said second leg, a third shaft secured to one of the awning slats below the said top pivoted slat, a gear on an extended end thereof in mesh with a gear on the lower end of said second shaft, said gear on the upper end of said second shaft meshing with said idler gear, said gear on said sprocket shaft also meshing with said idler gear, rigid means interconnecting the pivoted slats, and a chain and a sprocket on the said sprocket shaft for imparting rotation to said shafts and gears to pivot the awning slats to open or closed position.

2. An awning of a type having a plurality of movable slats, said awning including a top portion having a rear non-pivoted part and a front pivoted part above said pivoted slats, angular supporting brackets pivotally connected to the top pivoted slot of the said awning and supporting said top portion above said top pivoted awning slat, front and rear strap members pivotally connected to each longitudinal edge of each of the slats, said front straps being longer than said rear straps and having their respective top ends pivoted to said front pivoted part of the top portion, each of said brackets including an angularly downward extending arm pivoted to the top of the uppermost slat, eye bolts carried by said straps, said slats being formed with a roller tubular edge formed with slots to receive the eye end of the said bolts, said rolled edges serving as pivot pins within said bolt eyes, to thereby provide a pivotal connection between the slats and the said straps, and actuator means connected to one of said slats for imparting movement to said slats toward an open or a closed position when actuated by an operator.

ROBERT F. WHITFIELD.

REFERENCES CITED

The following references are of record in the file of this patent:

UNITED STATES PATENTS

| Number | Name | Date |
|---|---|---|
| 12,145 | Ward | Jan. 2, 1855 |
| 60,736 | Hutton | Jan. 1, 1867 |
| 274,013 | Medgarden | Mar. 13, 1883 |
| 425,723 | Armistead | Apr. 15, 1890 |
| 2,149,481 | Van Bosch et al. | Mar. 7, 1939 |
| 2,207,605 | Wolfe | July 9, 1940 |
| 2,252,677 | Ackerman | Aug. 12, 1941 |
| 2,296,467 | Dugan | Sept. 22, 1942 |